ELECTRICAL CONNECTION AND CIRCUITS AND THEIR MANUFACTURE

Filed June 14, 1948 3 Sheets-Sheet 1

INVENTOR
JOHN A. LENO
BY R.P. Morris
ATTORNEY

ELECTRICAL CONNECTION AND CIRCUITS AND THEIR MANUFACTURE

INVENTOR
JOHN A. LENO
BY R. P. Morris
ATTORNEY

April 3, 1951 J. A. LENO 2,547,022

ELECTRICAL CONNECTION AND CIRCUITS AND THEIR MANUFACTURE

Filed June 14, 1948 3 Sheets-Sheet 3

INVENTOR
JOHN A. LENO
BY R. P. Morris
ATTORNEY

Patented Apr. 3, 1951

2,547,022

UNITED STATES PATENT OFFICE 2,547,022

ELECTRICAL CONNECTIONS AND CIRCUITS AND THEIR MANUFACTURE

John Albert Leno, London, England, assignor to International Standard Electric Corporation, New York, N. Y., a corporation of Delaware Application June 14, 1948, Serial No. 32,923
In Great Britain June 25, 1947

4 Claims. (Cl. 250—16)

Figure 1:
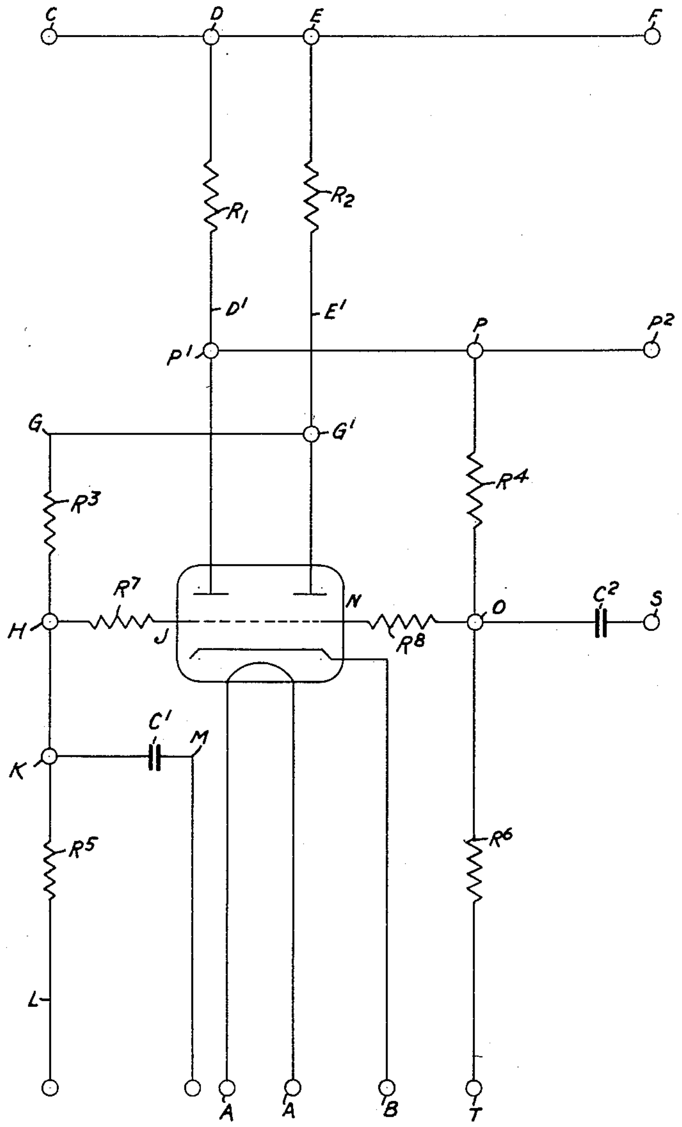

This invention relates to electrical connections and circuits and the manufacture thereof.

Conventional electrical circuits, consist of various components connected together by wires clamped or soldered to their terminals.

As long ago as 1903 it was suggested, in connection with the manufacture of ribbon cabling for automatic telephone systems, to form the conductors in situ by electro-deposition or by mechanical deposition as for example by ruling lines of metallic powder in a suitable medium directly upon a layer of insulating material.

Such proposals for forming conductors by depositing or printing films of conducting material on an insulating base, are now well known but the proposals to date here have serious limitations in regard to insulated cross-overs and involve expensive manufacturing processes.

The object of the present invention is to produce a method of manufacturing which is capable of handling electrical circuits of any complexity and which can be carried out on standard machines without the need for expensive jigs, tools and fixtures.

According to the invention there is provided a laminated unit formed wholly or in part of a plurality of layers of material at least one of which has provided thereon an electrical element or elements, circuit or circuits, the layer or layers immediately adjacent said element(s) or circuit(s) being of insulating material and each element or circuit being accessible for connecting purposes.

Another feature of the invention is an arrangement for an electrical circuit comprising a plurality of insulating sheets either faced with a thermosetting or thermoplastic material or of resin-impregnated paper the said sheets being superimposed and formed into a laminated unit, electrical conductors provided on at least one of said sheets and arranged so that there are no cross overs on any one sheet and components, e. g. capacitors, resistors, inductances, included in the circuit at the appropriate points.

Connections between the individual circuit parts and elements to make the complete circuit are made by having the points to be connected, or "bus-bars" for them, superimposed and making connection through holes in the intervening insulating sheets or layers or by arranging the circuit elements so that some or all such points or "bus-bars" for such points are on the periphery of the sheets or layers where they can be interconnected.

Preferably material used for the circuit unit is paper impregnated with thermosetting or thermoplastic resin or a plastic material so that the unit with component parts of the complete circuit therein together with all necessary extra insulating and protecting sheets or layers can be formed, e. g. by moulding under pressure, into a unit containing the circuit.

The paper may be acetylated preferably to a considerable degree. The acetylation reduces the moisture absorption properties of the paper with consequent decrease in the danger of current leakage taking place along surface paths. Other suitable base materials are textile and glass fabrics.

Layers of other stiff or flexible materials capable of incorporation in laminated units may be used for instance, mill board or wood-ply. Such material might be incorporated as such, or faced on one or both sides with a plastic or adhesive material.

Conducting material, usually silver or other metallic paste, may be deposited on the sheets or layers in any desired manner, e. g. electro-deposition, spraying, painting, printing, for instance by the silk screen process by an off-set press, or by a transfer process.

Alternatively, or for certain circuit elements only, metallic tape may be used, particularly where a higher-current-carrying capacity is required than can conveniently be provided by a metal film. The tape can be positioned in any desired manner, for instance, by being threaded through pairs of slits in the insulating material.

Normally the sheets or layers would be printed on one side only and stacked with the printed face of one sheet or layer in contact with the plain face of an adjacent sheet or layer. For certain purposes printed conducting elements or circuits on adjacent sheets or layers may be placed in contact; for example, to build up a condenser in a circuit, metal films may be deposited on the facing surfaces of two sheets or layers, a mica plate positioned over one film (for instance by slipping the corners into diagonal slits as in a postcard album) and the two film-carrying faces placed together with the mica between them. In such a case both sides of a sheet or layer might carry circuit elements. Alternatively in order to save the stack from bulging at the places where such insertions have been made, appropriate sheets or layers may be provided with apertures to accommodate component parts, e. g. mica plates for condensers or resistor elements.

Resistance elements may be deposited in the form of a film of carbon or other suitable material of suitable configuration between spaced points on metallic lines. Inductance elements may be provided in the manner disclosed in our U. S. copending Application No. 46,761, filed Aug. 30, 1948, now abandoned. Alternatively for small values the inductance element will merely be a spiral track printed on one surface.

Valve sockets, or a number of tubes to form a valve socket, connecting tags, and other items or elements may be formed into a built up circuit unit.

It is within the scope of the invention where simple circuit are concerned to form the circuit on a single sheet formed with as many reinforcing sheets as desired.

A single sheet may also be employed which is formed into a cylindrically or spirally wound tube one or more layers of the tube unit carrying electrical circuit(s) or element(s). Other possibilities exist e. g. one or more sheets may be folded in "book" form say with the circuit(s) or element(s) on one or more of the folded layers.

Where printed or otherwise deposited electrical conductors are used more satisfactory conductivity may be obtained by forming the unit during passage between heated rollers. The use of such rollers also facilitates the production of tubular units where these are required.

Figure 2:
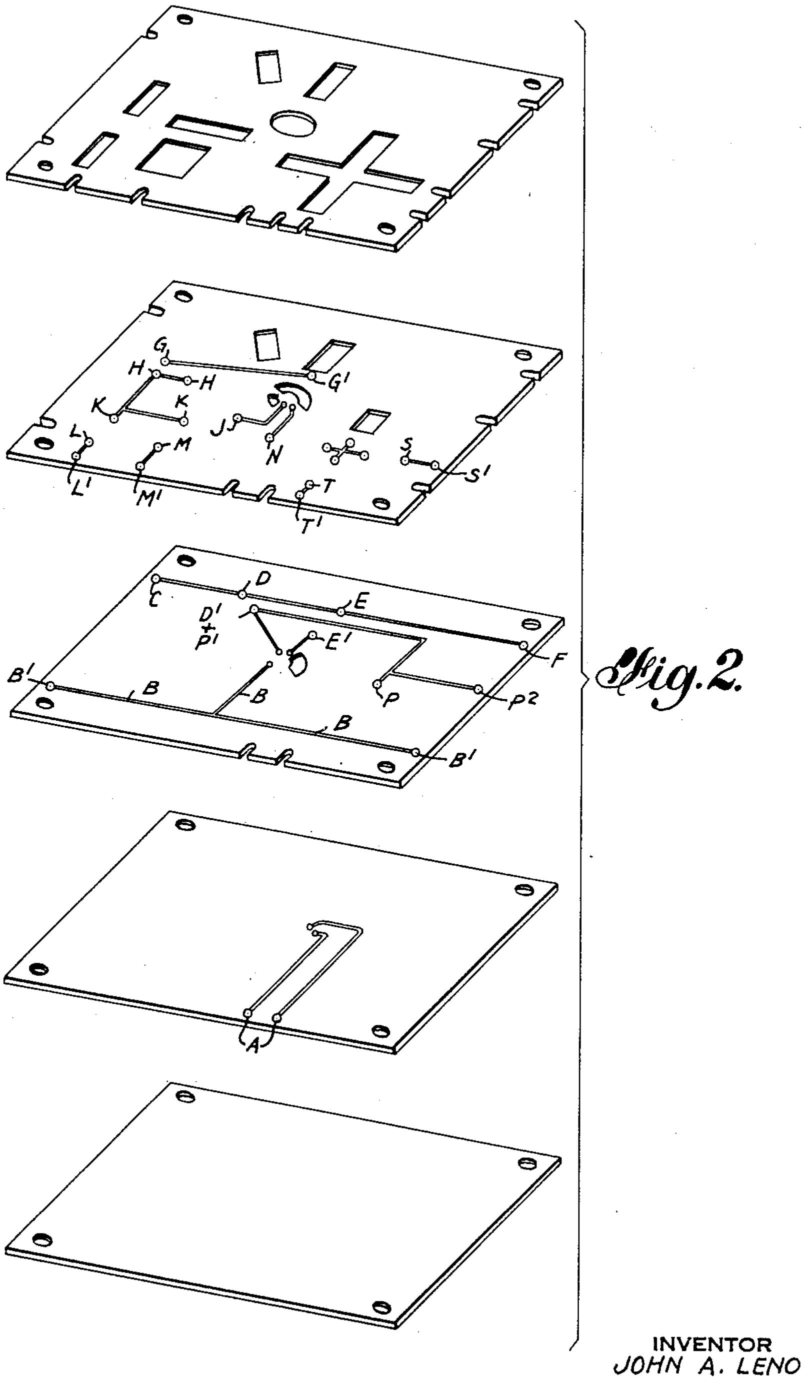
Figure 3:
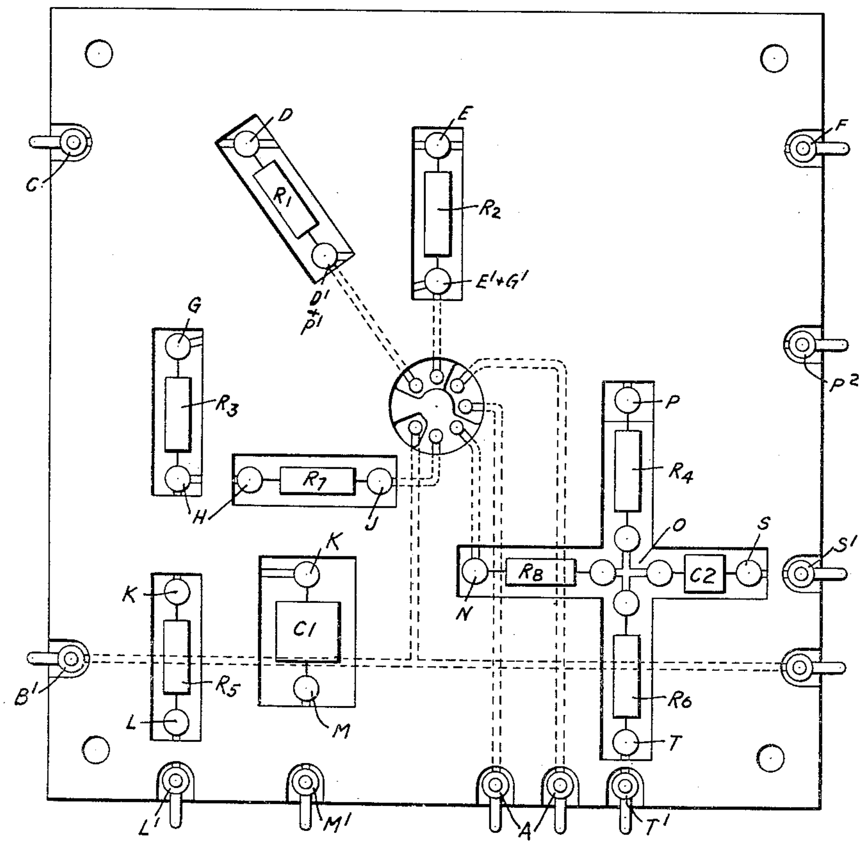

A simple example of the manufacture of an electrical circuit according to the invention will now be described with reference to the accompanying drawings in which:

Fig. 1 shows the circuit to be manufactured and the electrical components interconnected by the circuit;

Fig. 2 shows how the circuit has been analysed into parts each suitable for formation in a plane without cross-overs, and the parts formed on individual sheets which are shown in correct relative positions for stacking prior to formation into a unit by moulding, while Fig. 3 shows a plan-view of the moulded block containing the circuit of Fig. 1, and with certain electrical components assembled thereto.

In the example only the interconnecting conductors of the circuit are provded by means of the invention, the electrical components being of conventional form and assembled to the circuit block after completion.

It is however, possible to manufacture certain electrical components such as condensers, inductances and resistances as part of the process of building up the circuit unit as previously stated.

The top sheet in Fig. 2 has no conductive film printed thereon, but has a series of holes, the shapes and positions of which are such as to allow of making the necessary connections to the circuit after moulding. A number of such sheets may be used if desired for surface insulation and to give thickness.

The second sheet has circuit lines printed thereon and also apertures through which access will eventually be possible to the circuit elements on lower sheets.

The third sheet has further circuit elements printed on and one hole for access to valve leads carried by the fourth sheet. The leads on the fourth sheet are not printed on but are formed of metal tape because of the current carrying capacity required. The tapes are threaded through slits in the sheet as shown to position them.

It will be seen that where each circuit line on a sheet terminates at an edge the end of the line is enlarged and the sheets above are cut away above the enlarged end to allow connection to be made thereto after the block is finally made.

The bottom sheet (or sheets) does not carry circuits; the number of plain sheets may be considerable to give adequate surface insulation and to form a block of substantial thickness.

Additional plain sheets suitably apertured may be interleaved with the circuits carrying sheets for insulation purposes between parts of circuits or for strength and thickness.

The stack of sheets is now moulded in a heated press into a unit which may be flexible to a desired degree.

During moulding the insulating material "flows" completely around the metal so as to leave no voids.

The various components and their terminals have been given references in Fig. 1. These references are used in the exploded view of the various sheets in Fig. 2 and on the finished block in Fig. 3. It will be noted how certain terminals such as S, M, L, have been brought out of $S^1$, $M^1$, $L^1$ to the edge of the block for ease of connection. The earth lead B of Fig. 1 has been brought out to two terminals $B^1$, $B^2$, in Figs. 2 and 3.

The finished block or unit is provided with terminal tags for the exposed enlarged circuit terminations as shown in Fig. 3, condensers and resistances, indicated by blocks in Fig. 3, are put in position and soldered to the circuit, and the block is pierced centrally at the seven circuit terminations for the insertion of a valve holder.

There have been shown in this example, for ease of drawing, the circuit components mounted on the same side of the printed sheets to which they are individually attached. In practice it is preferable to mount them on the reverse side bringing leads through holes in the sheets to the connecting points. In this way direct pull on the connections can be avoided.

One method of making a connection between superposed points on different sheets is to cut away the upper sheet above the silvered point on the lower sheet and silver around the hole in the upper sheet; when moulded the two silvered surfaces will be found to be practically in the same plane and the two surfaces can be soldered together or to a terminal tag or the like.

In order to obtain a satisfactory soldered connection there should be deposited electrolytically on points on the circuit to which connections are required to be made, a metal such as copper. One satisfactory method of arranging such a deposit is as follows:

The point where the deposit is required is connected to a negative potential. The covered end of the copper rod is saturated with a suitable electrolyte and by careful adjustment of current a film can be quickly deposited. It is then possible to solder directly to the point using ordinary resin core solder.

Connecting points in the circuit are left exposed not necessarily in order that soldered connections to be made to them but that they may also be used to temporary making of contact, say in testing, or as a contact face to co-operate with a rubbing wiper, an example of the latter would be found in the manufacture according to the present invention of a telephone receiver capsule insulating disc as is disclosed in British Patent No. 624,149 issued September 9, 1949.

High insulation can be obtained by inserting any desired number of insulating sheets between sheets carrying circuit elements.

Previously circuits have been formed by deposition, printing or the like on ceramic or plastic mouldings, the manufacture of which involves expensive tools. In the present proposals, a commercially obtainable cheap material is used which is easily cut to size and pierced with suitable holes.

What is claimed is:

1. An electric circuit comprising a plurality of layers of insulating material having apertures therein, the apertures of two adjacent layers coinciding in part, electric conductors printed on non-contiguous surfaces of said adjacent layers, at least one of the conductors on each of said adjacent layers extending to a respective edge of its corresponding coinciding aperture, said conductors being peripherally spaced from each other at the aperture edge, whereby said conductors are arranged for independent connection at said apertures.

2. An electric circuit according to claim 1, wherein the aperture in the outer of said layers is larger than the coinciding aperture in the next adjacent inner layer.

3. An electric circuit according to claim 2, further comprising an outer covering sheet of insulating material covering substantially the conductors printed on the top layer of said plurality of layers, and having an aperture overlying said coinciding apertures.

4. An electric circuit unit for connection to external apparatus comprising a plurality of layers of insulating material having apertures therein, an aperture of each successive layer coinciding in part, the coinciding apertures of the outer layers each being successively larger than the corresponding aperture in successive layers, electric conductors printed on non-contiguous surfaces of the successive layers, at least one of the conductors on each of said layers extending to a respective edge of its corresponding coinciding aperture, said conductors being peripherally spaced from each other at the aperture edge of the largest aperture, whereby said external apparatus may be independently connected to separate of said conductors through the coinciding apertures.

JOHN ALBERT LENO.

REFERENCES CITED

The following references are of record in the file of this patent:

UNITED STATES PATENTS

| Number | Name | Date |
|---|---|---|
| 1,647,474 | Seymour | Nov. 1, 1927 |
| 2,066,876 | Carpenter et al. | Jan. 5, 1937 |

OTHER REFERENCES

Article entitled "Printed Circuit Wiring," in Electronics Industries, April 1946, page 90.

Pamphlet entitled "Printed Circuit Techniques," National Bureau of Standards Circular #468.